Nov. 25, 1969  J. C. McELWAIN  3,480,310
QUICK DETACHABLE COUPLING
Filed Sept. 29, 1967  4 Sheets-Sheet 1
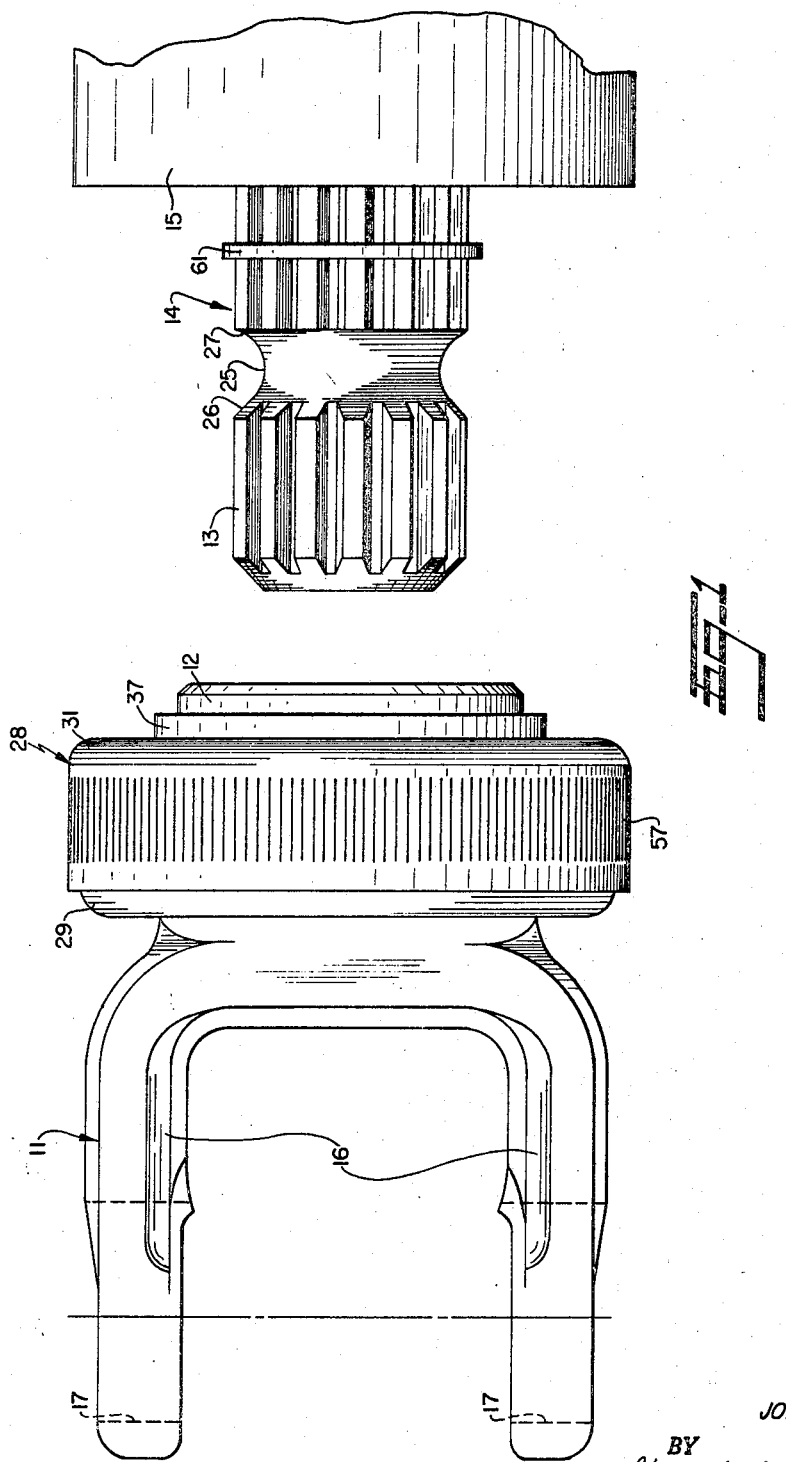
INVENTOR.
JOHN C. MCELWAIN
BY
ATTORNEYS

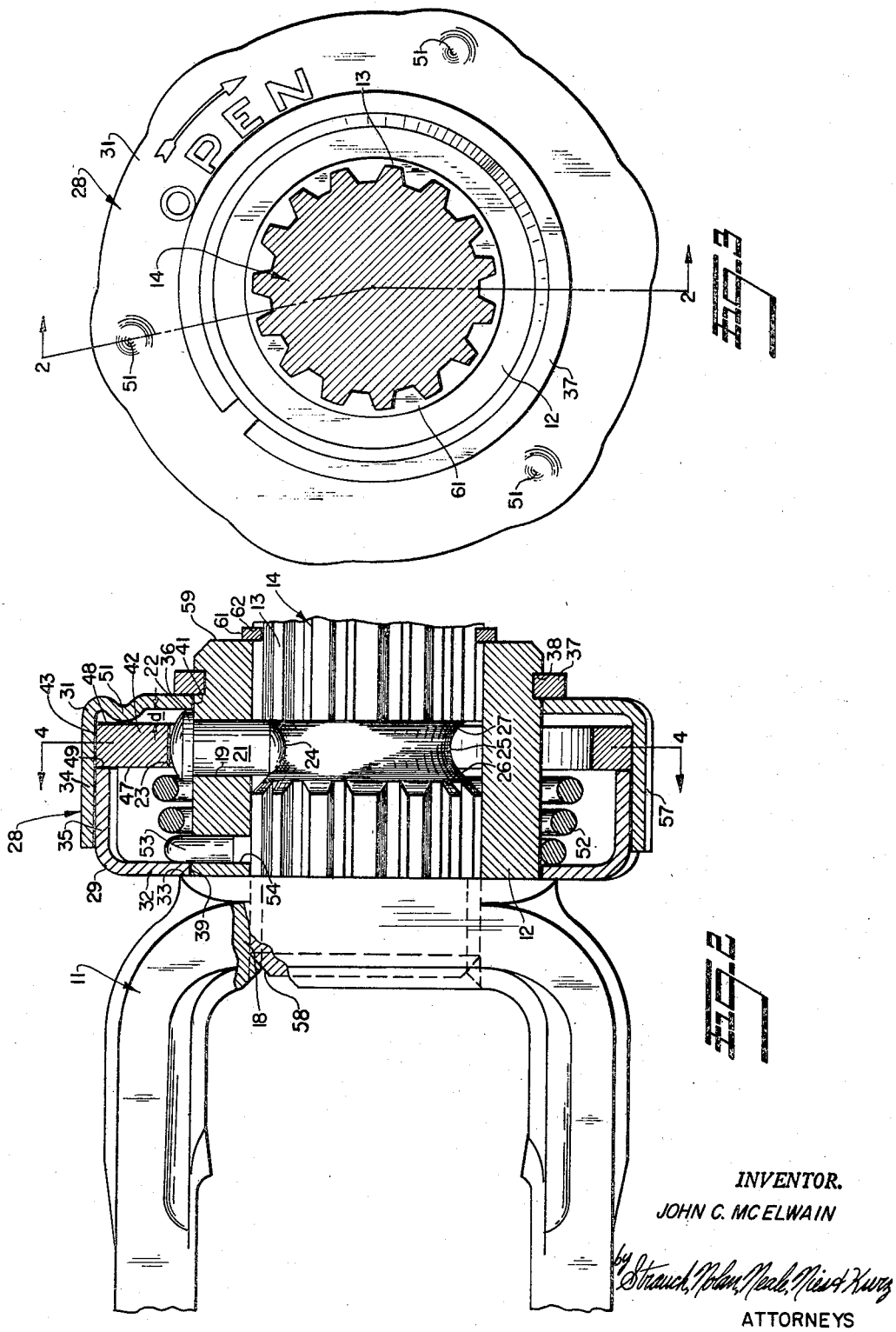

Nov. 25, 1969   J. C. McELWAIN   3,480,310
QUICK DETACHABLE COUPLING
Filed Sept. 29, 1967   4 Sheets-Sheet 3
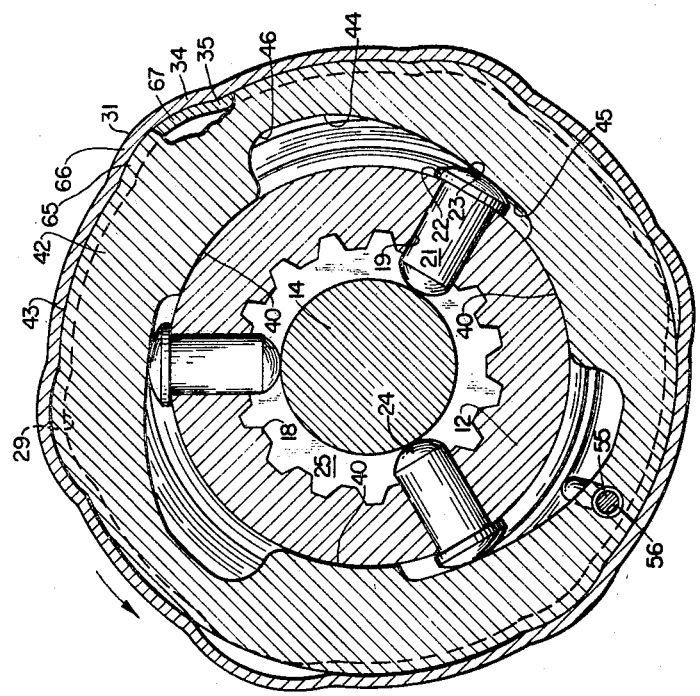
INVENTOR.
JOHN C. MC ELWAIN
BY
ATTORNEYS Nov. 25, 1969  J. C. McELWAIN  3,480,310
QUICK DETACHABLE COUPLING Filed Sept. 29, 1967  4 Sheets-Sheet 4

INVENTOR.
JOHN C. MC ELWAIN
BY
Strauch, Nolan, Neale, Nies & Kurz
ATTORNEYS

United States Patent Office 3,480,310
Patented Nov. 25, 1969

3,480,310
QUICK DETACHABLE COUPLING
John C. McElwain, Allegan, Mich., assignor to North American Rockwell Corporation, Pittsburgh, Pa., a corporation of Delaware
Filed Sept. 29, 1967, Ser. No. 671,877
Int. Cl. F16b 7/00; F16d 1/00
U.S. Cl. 287—119          5 Claims

ABSTRACT OF THE DISCLOSURE

A universal joint member has an internally splined hub axially slidably mounted upon a splined shaft having an annular groove adapted to receive the inner ends of locking pins radially slidable in the hub. The hub is surrounded by a rotatable but axially fixed casing rigidly carrying a cam having inclined inner surfaces for engaging the outer heads of the locking pins, and a torsion spring normally urges the casing and cam to a rotated position where the cam surfaces positively project the pins into the groove to lock the hub axially with the shaft. Upon manual rotation of the casing and cam as a unit against the force of the spring, deeper portions of the cam recesses are radially aligned with the pins so that upon axial pull the annular inclined side of the groove will cam the pins outwardly of the groove and permit full axial separation of the shaft and hub. For reassembly the casing and cam are turned to the unlocking position and the shaft is thrust into the hub, an inclined end surface on the shaft cams the pins outwardly, and then the casing is released to permit the spring to rotate the casing and cam to displace the pins into locking relation with the groove to thereby lock the hub to the shaft.

SUMMARY AND BACKGROUND OF INVENTION

The invention relates to quickly detachable couplings as for detaching an accessory drive shaft from a power take-off shaft when the attachment is not used.

It has been proposed to provide so-called quick detachable couplings between a universal joint member and a power take-off shaft wherein a transverse pin on the member extends into a transverse groove in the shaft, but to applicant's knowledge most of these devices are relatively slow to operate in that they require tools for disconnecting the pin from the groove. U.S. Letters Patent No. 3,053,062 issued Sept. 11, 1962 discloses a detachable coupling for separating a universal joint member from a splined power take-off shaft, but this mechanism apparently requires an operating tool and is more complex than that of the present invention.

The major object of the invention is to provide an improved quickly detachable coupling mechanism for separating a splined hub from a splined shaft wherein limited manual rotation of a cam or like device carried by the hub will unlock the hub and shaft for immediate axial separation.

It is a further object of the invention to provide an improved coupling assembly wherein the internally splined hub of a member such as a universal joint member is slidably axially fitted upon a splined power take-off shaft or the like, and the hub rotatably mounts a cam that internally engages the outer ends of a plurality of radially slidable locking pins on the hub engageable at their inner ends in a locking groove in the splined shaft. In a preferred embodiment the cam is fixed within a casing that is rotatable about the hub, the cam is resiliently biased toward pin locking position and this and other details constitute further objects of the invention.

BRIEF DESCRIPTION OF DRAWINGS

FIGURE 1 is a side elevation exploded view partly broken away showing an embodiment of the invention wherein one side of a universal joint is detachably connected to a shaft;

FIGURE 2 is a side elevation partially broken away and in section substantially on line 2—2 of FIGURE 3 showing details of the detachable coupling;

FIGURE 3 is an end view partly in section looking from right to left in FIGURE 2;

FIGURE 4 is a section substantially on line 4—4 of FIGURE 2 showing the relationship of the cam and the holding pins in the locked condition of the coupling;

FIGURE 5 is a section similar to FIGURE 4 but showing an intermediate position of rotation of the cam; and FIGURE 6 is a section similar to FIGURE 5 but showing the cam rotated to unlock the coupling pins to permit axial separation in the coupling.

FIGURE 1 shows one member 11 of a universal joint assembly having a hub 12 that is axially assembled onto the longitudinally splined end 13 of a drive shaft 14 which projects from a vehicle power shaft 15. For example shaft 14 may be the drive shaft for the front axle of a truck projecting from a transfer case at 15, or may be any other power take-off shaft.

Figure 9:
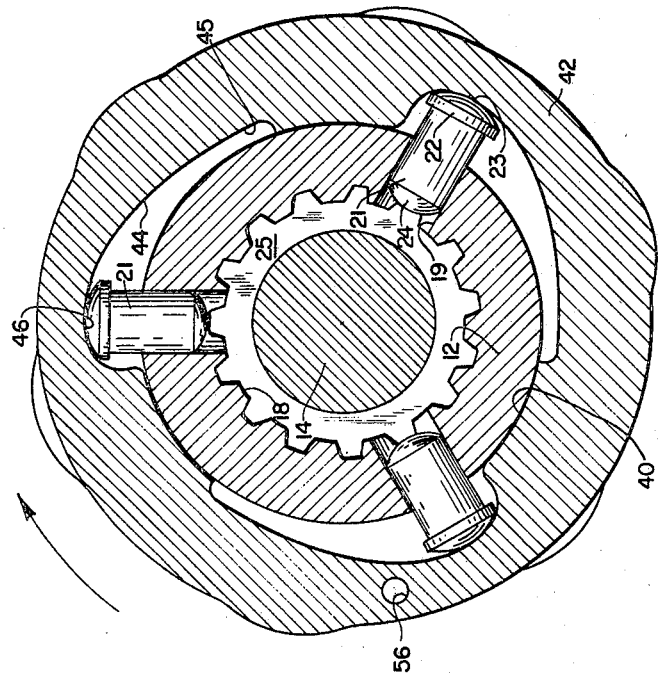
Figure 10:
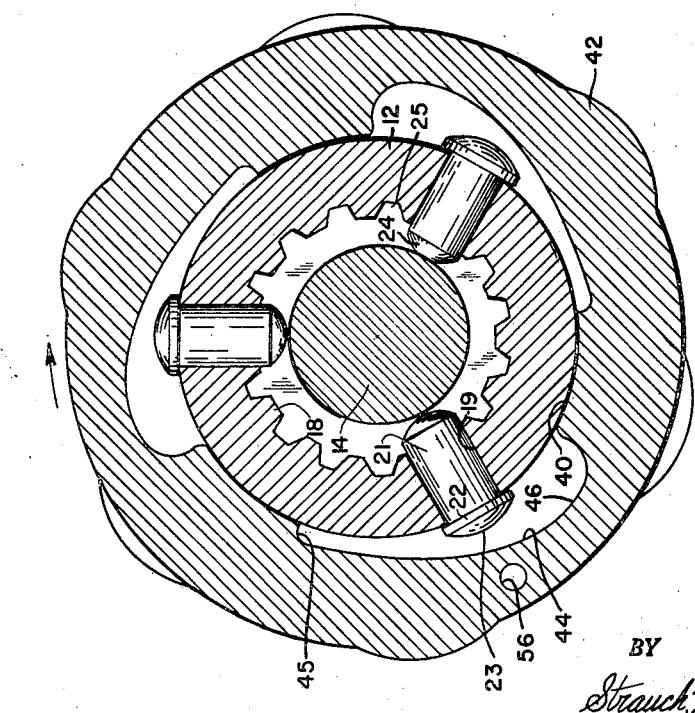

Universal joint member 11 has spaced arms 16 apertured at 17 to receive opposed arms of a cross-bearing assembly having two other arms fitted into a similar universal joint member (not shown) in the usual manner.

The interior of hub 12 is longitudinally splined at 18 to fit axially slidably over the splined shaft end at 13. Hub 12 is formed with a plurality of circumferentially equidistant radial bores 19 in which are freely slidably mounted identical pins 21. Pins 21 have enlarged heads 22 at their outer ends for limiting inward movement in their respective bores, and the head of each pin is preferably smoothly rounded as at 23.

Pins 21 are longer than the radial thickness of hub 12 and they have rounded inner ends 24 adapted to project within an annular groove 25 in shaft end 13. As shown in FIGURE 2, groove 25 is of uniform size and depth throughout with a rounded bottom and a sloping side, with the side 26 nearest the universal joint member being inclined at a smaller angle with respect to the axis of shaft 14 than the opposite side 27 which has the same contour as the groove bottom. Groove 25 extends perpendicular to the axis with side 26 at 45° to the axis.

Hub 12 is surrounded by a sheet metal coupling enclosing casing 28 composed of two opposed cup-shaped stamped parts 29 and 31, both apertured to rotatably fit axially slidably upon the hub. Part 29 has an end wall 32 that axially abuts a shoulder 33 in joint member 11, and part 31 which has an annular wall 34 telescoped over annular wall 35 of part 29 has an end wall 36 that axially abuts a snap ring 37 in a hub surface groove 38. The casing end walls are formed with the hub receiving apertures at 39 and 41. Apertures 39 and 41 and the outer surface of hub 12 are cylindrical. As shown in FIGURE 4, the telescoped walls 34 and 35 of the casing parts are non-circular in contour so that casing parts 29 and 31 are relatively non-rotatable.

An annular cam 42 has its external periphery 43 shaped to conform with an annular wall 34 so as to be non-rotatable with respect to the casing 28. The inner periphery of cam 42 (FIGURE 4) is cylindrical at 40 to rotatably surround hub 12 and a plurality of equally spaced identical recesses 44 are formed in surface 43 providing cam surfaces that slope from a minimum depth section 45 to a maximum depth section 46. All of the recessed cam surfaces slope in the same direction. As will appear the cam surfaces of recesses 44 engage the heads of pins 21 to determine the radial positions of the pins.

Cam 42 has flat parallel axial sides 47 and 48, and one side 47 abuts the inner flat edge 49 of casing part 29 in a plane perpendicular to the axis of shaft 14. Near its outer periphery the annular wall 36 of casing part 31 is formed with a plurality of, here three, equally spaced indentations providing rounded surface internal projections 51 that all lie in the same plane and engage the other side of cam 42. Thus the dimension $d$ indicated in FIGURE 2 which is the height of projections 51 determines the axial location of cam 42 within casing 28, and cam 42 is axially held against tilting within casing 28.

A torsion spring 52 has a plurality of coils surrounding hub 12 in spaced relation. One end of spring 52 is a radial tang 53 anchored in a radial bore 54 in hub 12 (FIGURE 2). The other end of spring 52 is an axial tang 55 (FIGURE 4) that extends axially to anchor within a bore 56 formed in cam 42. Torsion spring 52 thus biases cam 42 and the entire casing 28 which is rigid with cam 42 in a counterclockwise direction as viewed in FIGURES 4, 5 and 6 toward the FIGURE 4 limit position wherein the locking pins are forced by cam recess surfaces 45 to their radial innermost position to extend within shaft groove 25 and thereby prevent axial separation of shaft 14 and hub 12. This is the assembled coupled condition of the mechanism.

Should it be desired to uncouple joint member 11 from shaft 14, the operator grasps the knurled periphery 57 of casing 28 and turns the casing clockwise in FIGURES 3 and 4 and this, after about 30° of rotation, radially aligns the deepest surfaces 46 of cam recesses 44 with the locking pins 21. With the casing held rotated in this position, against the force of spring 52, the operator pulls member 11 to the left in FIGURE 2 whereupon the inclined side surface 26 of groove 25 cams the now free pins 21 radially outwardly until they clear groove 25 and shaft 14 may be axially completely withdrawn from hub 12. The operation is simple and speedy, requiring no tools.

For reassembly to the FIGURE 2 position the hub 12 is aligned with splines 13 and axially thrust upon shaft 14, with casing 28 rotated as described to its indicated FIGURE 6 position, and the hub slides over the shaft regardless of the radial positions of pins 21. In assembly the annular end chamfer 58 on shaft 14 forces all of the pins radially outwardly as permitted by the rotated cam (see FIGURE 6) and then, after the flat end 59 of hub 12 engages stop ring 61 suitably seated in a groove 62 on shaft 14, the operator releases the casing 28 which automatically under the force of torsion spring 52 resiliently rotates counterclockwise (FIGURE 5) so that cam recesses 44 cam pins 21 inwardly into locking relation with groove 25. In practice, stop ring 61 may not be necessary as encounter of pins 21 with the more steeply sloping side of groove 25 signals the desired axial position of the parts to the operator.

The invention provide a quick detachable coupling that is new in the art, requires no tools to operate, and is sturdy and simple in construction. The casing parts 29 and 31 and the cam 42 need not be permanently secured together by welding, screws or the like. These parts are rigidly connected against relative rotation by their given interlocking peripheral contours, as for example shown in FIGURE 4 where the outer periphery of cam 42 has a series of external convex protrusions 65 that fit into concave formations 66 in wall 34, and wall 35 has external protrusions 67 that also fit into formation 66. Cam 42 is axially clamped and located in the assembly by the casing face 49 engaging one side and the projections 51 engaging the other.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a quick detachable torque transmitting coupling assembly for non-rotatably connecting an inner member with a surrounding outer member, cooperating axially slidably interfitting means on said members for non-rotatably connecting said members, external recess means on said inner member, locking means transversely movably mounted on said outer member with an inner portion thereof adapted to extend into said recess means, axially fixed cam means rotatably mounted on said outer member for limited movement between a locking position where said cam means engages an outer portion of said locking means and positively projects the inner portion of said locking means into said recess means and a non-locking position wherein said cam means permits displacement of said locking means outwardly of said recess means, resilient means normally biasing said cam means into locking position an axially fixed casing mounted on said outer member enclosing said cam means and said resilient means, said casing being rigid with said cam means and rotatable about said outer member, and axially fixed stop means on said outer member slidably engaging said casing and preventing movement thereof in either axial direction along said outer member.

2. In the coupling assembly defined in claim 1, said axially fixed stop means on said outer member slidably engaging opposite sides of said casing.

3. In a quick detachable torque transmitting coupling assembly for non-rotatably connecting an inner member with a surrounding outer member, cooperating axially slidably interfitting means on said members for non-rotatably connecting said members, external recess means on said inner member, locking means transversely movably mounted on said outer member with an inner portion thereof adapted to extend into said recess means, axially fixed cam means rotatably mounted on said outer member for limited movement between a locking position where said cam means engages an outer portion of said locking means and positively projects the inner portion of said locking means into said recess means and a non-locking position wherein said cam means permits displacement of said locking means outwardly of said recess means, said cam means comprising an annular cam having an internal surface shaped for cooperation with said locking means and a lobed external surface and an axially fixed casing enclosing said cam rotatably mounted on said outer member, said casing having a lobed peripheral wall formed to correspondingly fit with the external lobed surface of said cam for non-rotatably securing the cam to the casing and providing an external gripping surface for rotating said casing, and resilient means normally biasing said cam means into locking position.

4. A quickly detachable torque transmitting coupling assembly between a splined shaft and an internally splined annular member mounted thereon comprising an annular surface recess on said shaft, a plurality of locking pins substantially radially slidably mounted on said member, an axially fixed casing rotatably mounted on said member, cam means fixed within said casing in surrounding relation to the outer ends of said pins, said casing being rotatable between a locking position where said cam means engages the outer ends of said pins and positively projects the pin inner ends into said recess and a non-locking position wherein said cam means permits outward displacement of said pins from said recess, said casing comprising two opposed cup-shaped annular members mounted with their side walls telescoped and said cam means being a cam ring axially clamped between said casing members and non-rotatably secured to at least one of said casing members, and resilient means enclosed by said casing for normally biasing said cam means to said locking position.

5. In the coupling assembly defined in claim 4, said resilient means comprising a torsion spring surrounding said outer member with one end anchored on said outer member and the other end anchored in said cam ring.

References Cited

UNITED STATES PATENTS

| | | | |
|---|---|---|---|
| 1,376,384 | 4/1921 | Logan | 279—71 |
| 2,135,223 | 11/1938 | Scheiwer | 285—277 X |
| 2,948,559 | 8/1960 | Recker | 287—119 |
| 3,083,042 | 3/1963 | Collar | 285—314 X |
| 3,252,721 | 5/1966 | Weasler | 287—119 |
| 3,260,541 | 7/1966 | Sadler et al. | 287—535 |

DAVID J. WILLIAMOWSKY, Primary Examiner

A. V. KUNDRAT, Assistant Examiner

U.S. Cl. X.R.

285—314